(12) United States Patent
Sonoda et al.

(10) Patent No.: US 6,779,625 B2
(45) Date of Patent: Aug. 24, 2004

(54) STEERING DAMPER

(75) Inventors: Hirotetsu Sonoda, Saitama (JP); Tatsuya Harada, Saitama (JP)

(73) Assignee: Unisia JKC Steering Systems Co., Ltd., Kanagawa (JP)

( * ) Notice: Subject to any disclaimer, the term of this patent is extended or adjusted under 35 U.S.C. 154(b) by 273 days.

(21) Appl. No.: 10/152,792

(22) Filed: May 23, 2002

(65) Prior Publication Data

US 2004/0055808 A1 Mar. 25, 2004

(30) Foreign Application Priority Data

May 28, 2001 (JP) ..................................... P2001-159003
Jul. 4, 2001 (JP) ..................................... P2001-203916

(51) Int. Cl.[7] ................................................ B62D 5/06
(52) U.S. Cl. ...................... 180/422; 180/441; 91/375 A
(58) Field of Search ................................ 180/400, 417, 180/421–423, 439, 441, 442; 91/375 A

(56) References Cited

U.S. PATENT DOCUMENTS

| | | | |
|---|---|---|---|
| 5,910,889 A | * | 6/1999 | Larsen et al. ................. 363/40 |
| 6,217,296 B1 | * | 4/2001 | Miyazawa et al. ........... 417/310 |
| 6,267,040 B1 | * | 7/2001 | Sonoda et al. ................. 91/420 |
| 6,352,016 B1 | * | 3/2002 | Asbrand et al. ............... 91/491 |
| 6,415,885 B2 | * | 7/2002 | Sonoda ........................ 180/422 |
| 2001/0013442 A1 | * | 8/2001 | Sonoda ........................ 180/441 |

FOREIGN PATENT DOCUMENTS

| | | |
|---|---|---|
| JP | 2-49109 | 12/1990 |
| JP | 2001-301632 | 10/2001 |

* cited by examiner

Primary Examiner—Lesley D. Morris
Assistant Examiner—Matt Luby
(74) Attorney, Agent, or Firm—Sughrue Mion, PLLC

(57) ABSTRACT

A steering damper has a pair of damper portions each including a variable throttle valve for restricting inflow from a power cylinder into a flow passage change-over valve, the variable throttle valve provided on the way to each cylinder passage and a first check valve for permitting inflow from the flow passage change-over valve into the power cylinder, the check valve connected in parallel with the variable throttle valve. The steering damper has a second check valve in communication to a tank between the first check valve and left and right chambers of the power cylinder.

21 Claims, 8 Drawing Sheets

STEERING DAMPER

The present disclosure relates to the subject matter contained in Japanese Patent Application No. 2001-159003 filed May 28, 2001 and Japanese Patent Application No. 2001-203916 filed Jul. 4, 2001, which are incorporated herein by reference in its entirety.

BACKGROUND OF THE INVENTION

1. Field of the Invention

The present invention relates to a steering damper for a power cylinder apparatus that produces a power assist force (steering auxiliary force) by switching a flow passage change-over valve upon a steering operation of a steering wheel and activating a power cylinder, in which the steering damper serves to damp or relieve an impact when road load such as a kick back is applied to the side of the steering wheel.

2. Description of the Related Art

Generally, the hydraulic power steering apparatus according to the related art has a flow passage change-over valve for selectively connecting a pump and a tank to a left or right chamber of a power cylinder in accordance with a steering operation of the steering wheel. This flow passage change-over valve enables a pressure oil to be supplied to any one of the left and right chambers for the power cylinder in accordance with the steering operation to apply a power assist force to rotate the steering wheel.

The vehicles having such power steering apparatus with the steering damper has been well known. This steering damper acts to damp or relieve an impact when road load (so-called a kick back) is exerted from the side of front wheels due to irregularities or an obstacle on the road surface, for example, and to prevent the impact from being transmitted to the steering wheel, when a vehicle is driving.

The steering damper according to the related art is typically provided with a aperture or a variable aperture for applying a resistance to a flow of pressure oil exhausted from a chamber of the power cylinder on the return side in accordance with the movement of a piston, when road load such as kick back is exerted on the left or right cylinder passage between the flow passage change-over valve and the left or right chamber of the power cylinder. However, this aperture or variable aperture produces a flow passage resistance to the flow of pressure oil on the supply side from the pump to one chamber of the power cylinder and the flow of pressure oil on the return side from the other chamber of the power cylinder to the tank, when a positive input is made in accordance with the steering operation of the steering wheel. This results in a problem that the responsibility of the power cylinder is decreased.

Therefore, a power damper has been already proposed in which the aperture is constituted of a variable throttle valve in the left and right cylinder passages, and a check valve is provided in parallel with the variable throttle valve, so that the pressure oil can be supplied sufficiently from the pump via the flow passage change-over valve to the cylinder chamber by opening the check valve in the corresponding cylinder passage, when a positive input is made by the steering operation (Japanese Utility Model Publication No. Hei. 2-49109).

The above Japanese Utility Model discloses that the steering damper having "a check valve for permitting only a flow of oil from the change-over valve to an oil chamber of a steering damper main body and a throttle check valve with an initial load for permitting only a flow of oil from the oil chamber to the change-over valve, in a circuit connecting the steering damper main body (power cylinder) and the change-over valve".

The steering damper of the related art, which is disposed on the power steering apparatus, had a problem that the steering wheel can not be returned excellently, especially at or near the neutral position, because the variable throttle valve is not opened for a small flow from the power cylinder and does not produce any flow passage for flowing back the oil to the flow passage change-over valve. Also, if the flow passage for flowing back a fluid of small flow from the power cylinder is provided, a fluid fed from the flow passage change-over valve upon the steering operation flows out before opening the check valve, not affording a preset force, resulting in a problem that the vehicle has a bad straight drive stability (response sense) while running at high speed.

Even if the check valve is structured to be applied a preset force, when the preset force is large and, for example, rapid steering is performed, the handle turns heavy suddenly or is returned unfavorably. This is a problem.

In order to avoid the problem that the steering wheel can not be returned excellently, especially at or near the neutral position, because the variable throttle valve is not opened for a small flow from the power cylinder, the steering damper according to the related art provided in the power steering apparatus is formed with a leak passage having a plurality of narrow grooves arranged at an equal interval in a circumferential direction on the valve plug side or valve seat side for the check valve (JP-A-Hei. 11-49004).

However, there was a problem with the shape of the leak passage according to the related art as described in JP-A-Hei. 11-49004 that the manufacturing costs were high, and because of the leak passage consisting of the plurality of narrow grooves, it was difficult to hold the balance on the circumference or to control the passage area at high precision.

The present invention has been achieved in the light of the aforementioned problems, and it is an object of the invention to provide a steering damper for suppressing a negative pressure occurring in the cylinder passage at the time of rapid steering or when the handle is returned, thereby avoiding a situation that the handle turns heavy suddenly or is returned unfavorably.

Also, it is another object of the invention to provide a steering damper in which the shape of the leak passage is worked at high precision and the manufacturing costs can be reduced.

Further, it is another object of this invention to provide an inexpensive steering damper in which the material costs and the working costs can be reduced.

Moreover, it is another object of this invention to provide a steering damper in which a pressure loss in a flow of the fluid passing from the inside of the valve plug for the check valve to the outside is greatly reduced to be almost equivalent to the pressure loss of a flow of the fluid passing from the outside to the inside.

Further, it is another object of the invention to provide a steering damper in which the aperture can be tuned easily by properly adjusting the length of the communication hole formed on the bottom of the second valve plug.

SUMMARY OF THE INVENTION

According to a first aspect of the present invention, there is provided a steering damper attached to a power steering apparatus having a flow passage change-over valve for selectively changing a flow passage among a pump and a tank and left and right chambers of the power cylinder in accordance with steering operation of a steering wheel, and a pair of left and right cylinder passages for connecting the flow passage change-over valve to the left and right chambers, the steering damper comprising:

a pair of damper portions each having:

a variable throttle valve for restricting inflow from the power cylinder into the flow passage change-over valve, the variable throttle valve provided between the flow passage change-over valve and each of the left and right chambers of the power cylinder; and a first check valve for permitting inflow from the flow passage change-over valve into the power cylinder, the check valve connected in parallel with the variable throttle valve; and second check valves in communication to the tank, provided between the first check valves and the left and right chambers.

The steering damper according to the first aspect of the invention has the second check valve in communication to the tank in each of the cylinder passages leading from the flow passage change-over valve to the left and right chambers of the power cylinder. Therefore, at the time of rapid steering, for example, if the supply of a pressure oil to one cylinder chamber is delayed to cause the cylinder passage to become a negative pressure, the second check valve is opened to communicate to the tank to refill a working fluid, thereby preventing the handle from turning heavy.

According to a second aspect of the invention, the steering damper according to the first aspect of the invention further has communication bores provided between the flow passage change-over valve and the left and right cylinder chambers. The communication bores are connected in parallel with the variable throttles, respectively.

According to a third aspect of the invention, there is provided a steering damper attached to a power steering apparatus having a flow passage change-over valve for selectively changing a flow passage among a pump and a tank and left and right chambers of the power cylinder in accordance with steering operation of a steering wheel, and a pair of left and right cylinder passages for connecting the flow passage change-over valve to the left and right chambers, the steering damper comprising:

a pair of damper portions each having:

a variable throttle valve for restricting inflow from the power cylinder into the flow passage change-over valve in accordance with steering operation of a steering wheel, the variable throttle valve provided between the flow passage change-over valve and the left and right chambers of the power cylinder; and a first check valve for permitting inflow from the flow passage change-over valve into the power cylinder, the check valve connected in parallel with the variable throttle valve;

wherein the variable throttle valve has:

a step portion, which is a valve seat of the variable throttle valve formed on an inner surface of a housing; and a barrel-like valve plug for abutting with the step portion to close the variable throttle valve;

wherein a first biasing member biases the barrel-like valve plug in a valve seat direction;

wherein the first check valve has:

a cylindrical valve plug with bottom for abutting an opening portion of the barrel-like portion to close the first check valve; and a second biasing member for biasing the cylindrical valve plug with bottom from a direction opposite to the first biasing member; and wherein a communication bore is formed through a bottom face of the cylindrical valve plug with bottom.

Since the steering damper according to the third aspect of the invention is provided with the communication bore through the bottom face of the cylindrical valve plug with bottom for the first check valve as the leak passage, the passage area can be controlled at high precision and the manufacturing costs can be reduced.

According to a fourth aspect of the invention, the steering damper according to the third aspect further has second check valves in communication to the tank. The second check valves are provided between the first check valves and the left and right chambers of the power cylinder.

According to a fifth aspect of the invention, there is provided the steering damper according to the first aspect in which a valve plug of the first check valve is molded by press working.

In the fourth and fifth aspects of the invention, the valve plug of the check valve is molded by press working, whereby the material costs and the manufacturing costs can be greatly reduced.

According to a sixth aspect of the invention, there is provided the steering damper according to the third aspect in which a valve plug of the first check valve is molded by press working.

Also, according to a seventh aspect of the invention, the cylindrical valve plug with bottom has a passage hole to penetrate inside and outside in a cylindrical portion thereof. A cap is attached within the cylindrical valve plug on a side closer to the bottom thereof than the passage hole.

According to an eighth aspect of the invention, fluid from the flow passage change-over valve is flown from an outer face of the cylindrical valve plug through the passage hole thereinto. Fluid from the side of the power cylinder is flown from the inside of the cylindrical valve plug through the passage hole to the outer face thereof.

According to a ninth aspect of the invention, the cap has an inclined face for smoothly flowing a fluid that flows from the inside of the passage hole to the outside thereof.

In the seventh to ninth aspects of the invention, since the a space on the bottom portion of the valve plug for the check valve can be eliminated or decreased by the cap, a pressure loss of fluid flowing from the inside of the valve plug to the outside is reduced.

According to a tenth aspect of the invention, a communication bore that penetrates through a bottom face of said valve plug for said check valve is formed and a communication bore is formed on a bottom face of the cap.

In the tenth aspect of the invention, the valve plug for the check valve molded by press working has so small a thickness that the length of the communication bore can not be secured sufficiently, but it is possible to secure a required length of the communication bore (aperture hole) by providing the similar communication bore in the cap.

According to a eleventh aspect of the invention, the steering damper has the cap molded by press working.

According to a twelfth aspect of the invention, the communication bore is defined by a plurality of the caps, which overlap each other.

According to a thirteenth aspect of the invention, the length of the communication bore is variable.

In the twelfth and thirteenth aspects of the invention, the plurality of caps are molded by press working and overlaid, the length of the communication bore can be arbitrarily set by changing the number of layers, whereby the aperture can be easily tuned.

According to a fourteenth aspect of the invention, there is provided a power steering apparatus comprising:
- a pump for supplying oil;
- a tank for receiving returned oil;
- a power cylinder having left and right chambers;
- a flow passage change-over valve for selectively changing a flow passage among the pump and the tank and the left and right chambers in accordance with steering operation of a steering wheel;
- a steering damper having:
  - a pair of damper portions each including:
    - a variable throttle valve for restricting inflow from the power cylinder into the flow passage change-over valve, the variable throttle valve provided between the flow passage change-over valve and each of the left and right chambers of the power cylinder; and
    - a first check valve for permitting inflow from the flow passage change-over valve into the power cylinder, the check valve connected in parallel with the variable throttle valve; and
  - second check valves in communication to the tank, provided between the first check valves and the left and right chambers.

According to a fifteenth aspect of the invention, the steering damper further has communication bores provided between the flow passage change-over valve and the left and right cylinder chambers and the communication bores are connected in parallel with the variable throttles, respectively.

According to a sixteenth aspect of the invention, there is provided a power steering apparatus comprising:
- a pump for supplying oil;
- a tank for receiving returned oil;
- a power cylinder having left and right chambers;
- a flow passage change-over valve for selectively changing a flow passage among the pump and the tank and the left and right chambers in accordance with steering operation of a steering wheel;
- a steering damper having:
  - a pair of damper portions each including:
    - a variable throttle valve for restricting inflow from the power cylinder into the flow passage change-over valve, the variable throttle valve provided between the flow passage change-over valve and each of the left and right chambers of the power cylinder; and
    - a first check valve for permitting inflow from the flow passage change-over valve into the power cylinder, the check valve connected in parallel with the variable throttle valve; and
  - wherein the variable throttle valve has:
    - a step portion, which is a valve seat of the variable throttle valve formed on an inner surface of a housing; and
    - a barrel-like valve plug for abutting with the step portion to close the variable throttle valve;
  - wherein a first biasing member biases the barrel-like valve plug in a valve seat direction;
  - wherein the first check valve has:
    - a cylindrical valve plug with bottom for abutting an opening portion of the barrel-like portion to close the first check valve; and
    - a second biasing member for biasing the cylindrical valve plug with bottom from a direction opposite to the first biasing member; and
  - wherein a communication bore is formed through a bottom face of the cylindrical valve plug with bottom.

According to a seventeenth aspect of the invention, the steering damper further has second check valves in communication to the tank the second check valves are provided between the first check valves and the left and right chambers of the power cylinder.

According to an eighteenth aspect of the invention the cylindrical valve plug with bottom has a passage hole to penetrate inside and outside in a cylindrical portion thereof a cap is attached within the cylindrical valve plug on a side closer to the bottom thereof than the passage hole.

According to a nineteenth aspect of the invention, the cap has an inclined face for smoothly flowing a fluid that flows from the inside of the passage hole to the outside thereof.

According to a twentieth aspect of the invention, a communication bore that penetrates through a bottom face of said valve plug for said check valve is formed and a communication bore is formed on a bottom face of said cap.

According to a twenty-first aspect of the invention, the communication bore is defined by a plurality of the caps, which overlap each other.

BRIEF DESCRIPTION OF THE PREFERRED EMBODIMENTS

Exemplary embodiments are described below based on the drawings, in which like numerals represent like parts, and wherein.

DETAILED DESCRIPTION OF THE PREFERRED EMBODIMENTS

[First Embodiment]

Figure 1:
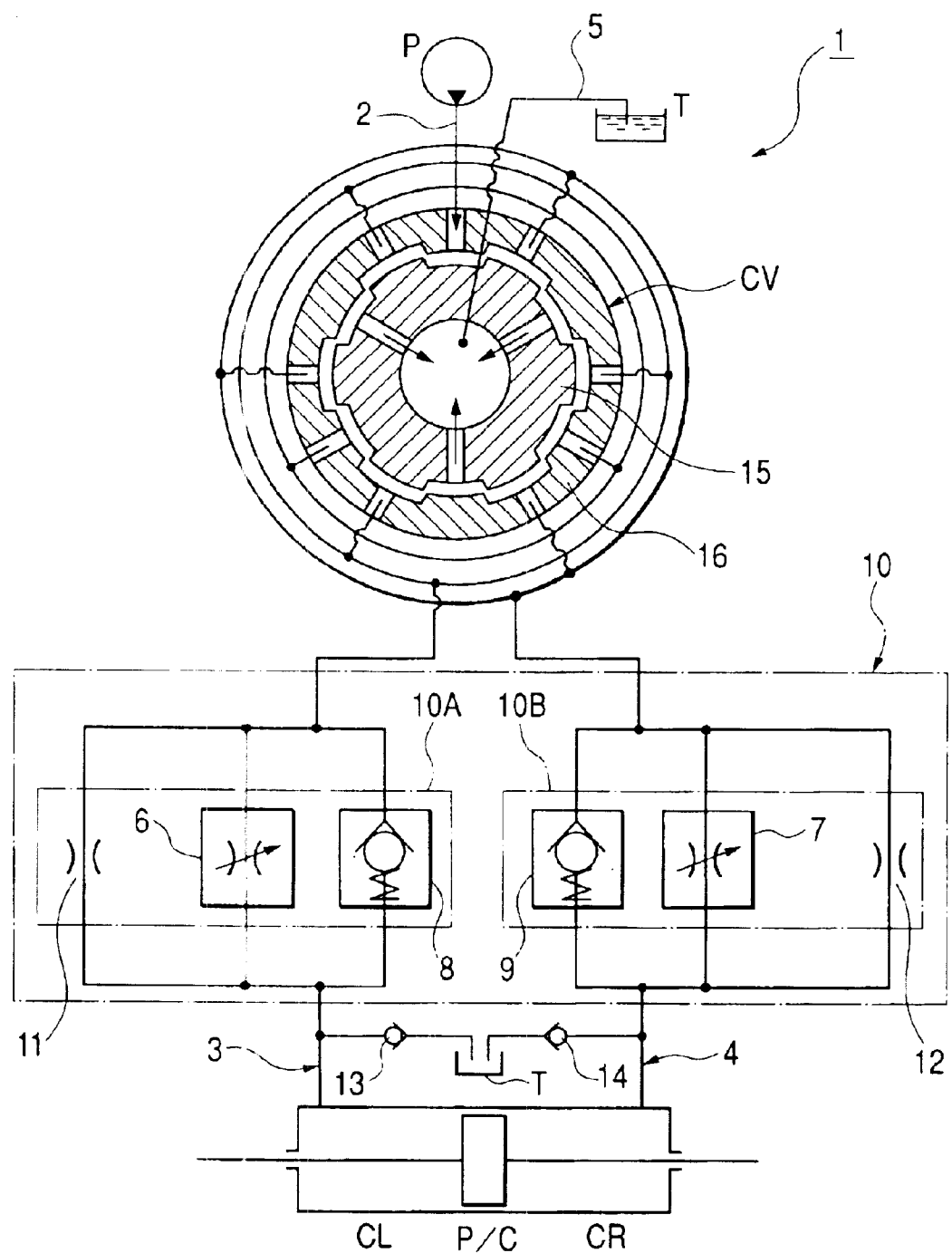
FIG. 1 is a hydraulic circuit diagram of a power steering apparatus having a steering damper according to a first embodiment of the present invention.
Figure 2:
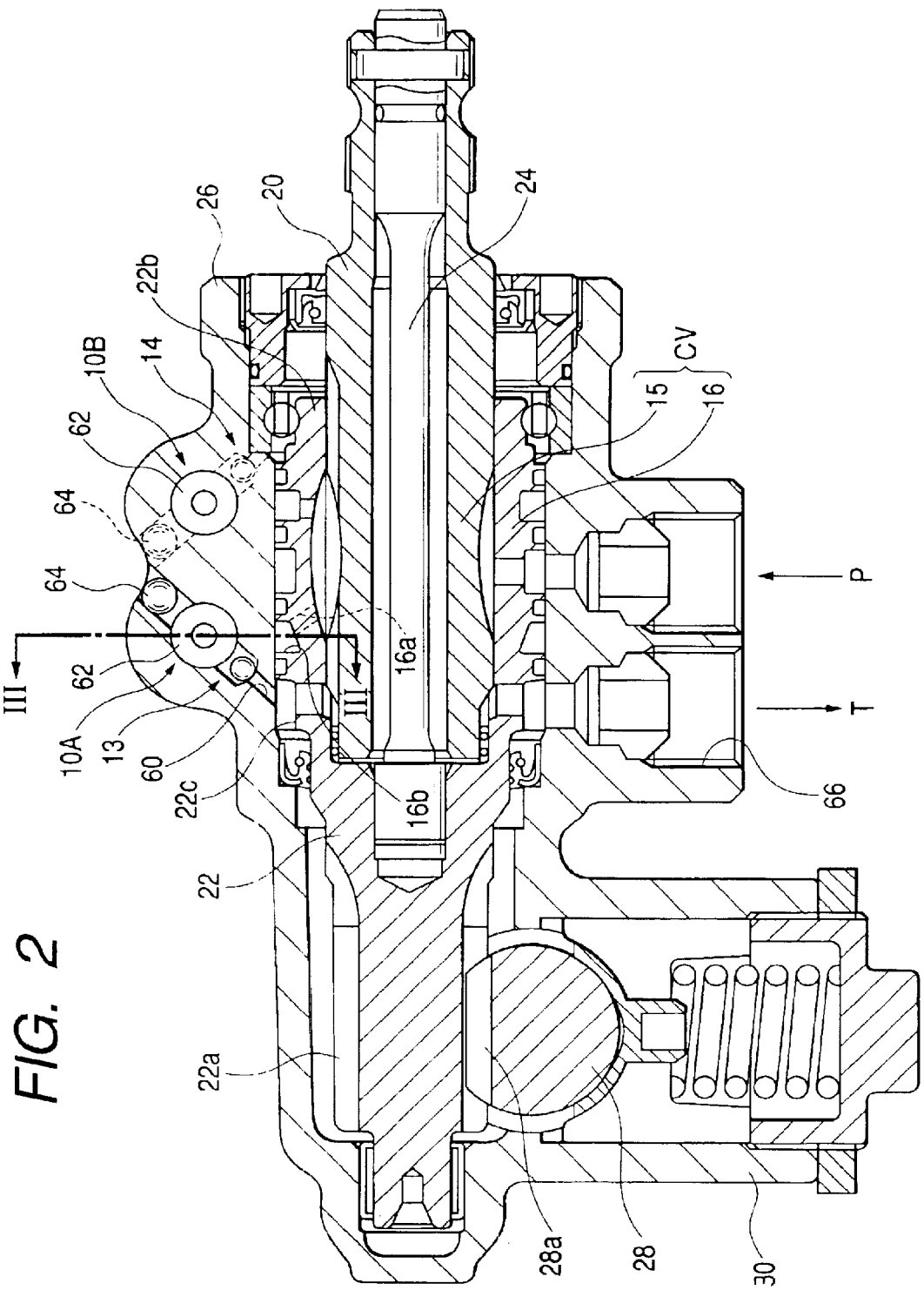
FIG. 2 is a cross-sectional view of a rack-and-pinion type power steering apparatus having the steering damper according to the first embodiment of the invention, taken through an axial line of the input and output shafts.
Figure 3:
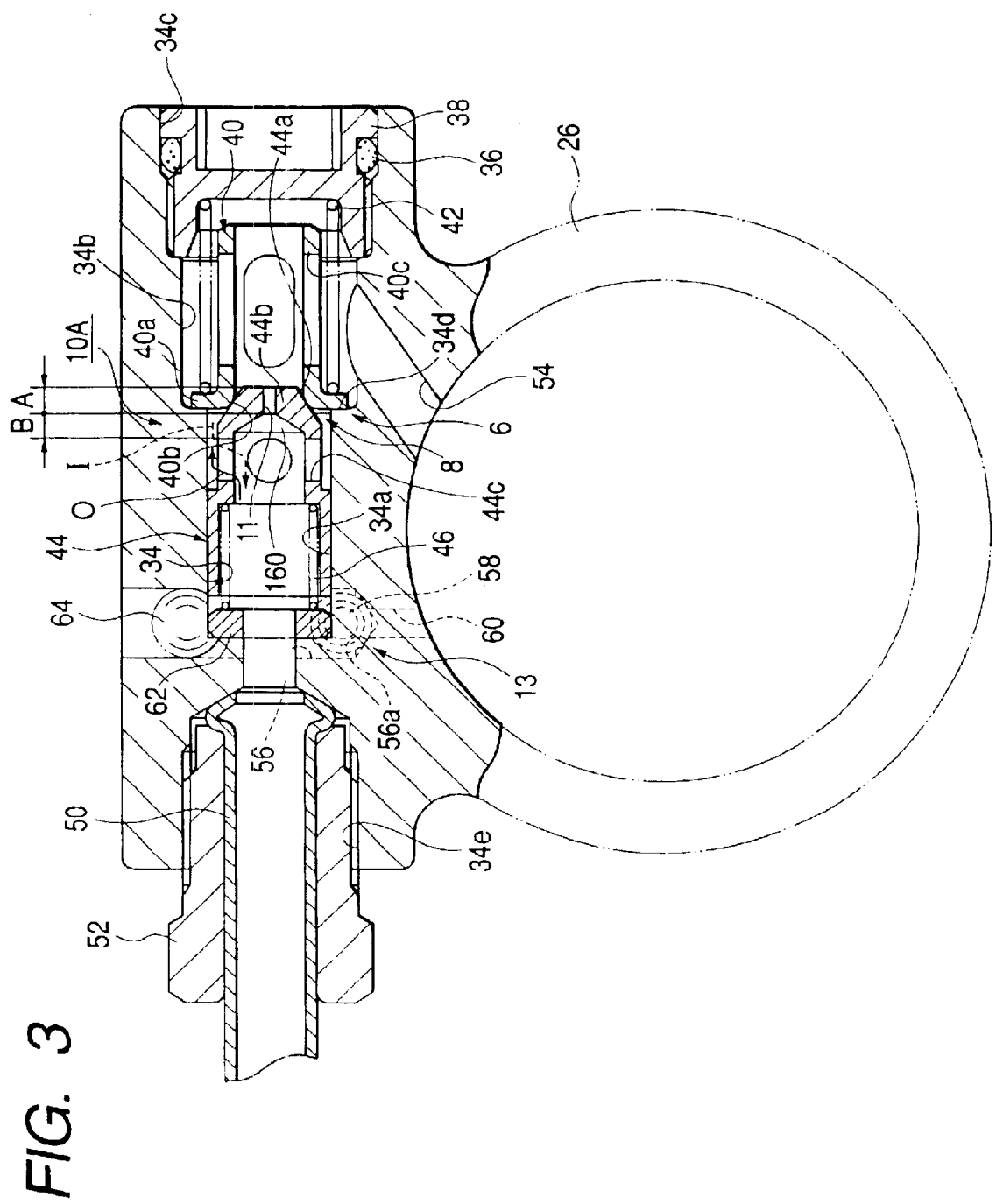
FIG. 3 is a cross-sectional view showing one damper portion of the steering damper, taken along the line III—III in FIG. 2.

The embodiments of the present invention will be described below with reference to the accompanying drawings. FIG. 1 is a view for explaining a hydraulic circuit of a power steering apparatus having a steering damper according to the invention. FIG. 2 is a view showing an example of the power steering apparatus having the steering damper. FIG. 3 is a view showing, in enlargement, a section taken along a line III—III in FIG. 2.

First of all, the hydraulic circuit of the power steering apparatus (designated by reference numeral 1 as a whole) in FIG. 1 is outlined. This hydraulic circuit feeds a pressure oil supplied via a supply passage 2 from a pump P as a hydraulic source, via a flow passage change-over valve (control valve) CV that is switched in accordance with a steering operation of a steering wheel (not shown) to one of the left and right chambers CL and CR of a power cylinder P/C that is an apparatus actuator, and a working fluid within the other cylinder chamber is flowed back to a tank T.

In FIG. 1, reference numerals 3 and 4 denote a cylinder passage from the flow passage change-over valve CV to the left and right chambers CL and CR for the power cylinder P/C. Reference numeral 5 denotes a return passage from the flow passage change-over valve CV to the tank T. In this embodiment, the flow passage change-over valve CV is of the rotary type and has a rotor 15 and a sleeve 16.

In the power steering apparatus 1, the flow passage change-over valve CV controls the switching between the cylinder passages 3, 4 to the left and right chambers CL and CR for the power cylinder P/C in accordance with a steering operation condition (e.g., steering direction, steering angle, operation speed) of the steering wheel (not shown). By this switching, a pressure oil discharged from the pump P is fed to any one of the chambers CL and CR for the power cylinder P/C, with the other chamber CR or CL being connected to the tank T, whereby the power cylinder P/C can produce a power assist force for assisting the operation force.

A pair of left and right damper portions 10A and 10B that make up a steering damper 10 are provided on the way to the left and right cylinder passages 3 and 4 of the power steering apparatus 1. The variable throttle valves 6 and 7 are provided on the pair of left and right damper portions 10A and 10B, respectively. These variable throttle valves 6 and 7 are configured such that the opening area is changed depending on the amount of flow passing on the return side from any one of the chambers CL and CR of the power cylinder P/C via the flow passage change-over valve CV to the tank T when road load such as kick back from the front wheels is made.

The variable throttle valves 6 and 7 can damp or relieve an impact owing to a flow resistance caused by a flow of pressure oil from the chamber CL or CR of the power cylinder P/C on the return side, when the impact is caused by road load from the front wheels, and thereby fulfill a function as the damper. Also, the variable throttle valves 6 and 7 permit the flow on the return side from the cylinder chambers CL and CR to the flow passage change-over valve CV, in which depending on the amount of passing flow, the aperture opening is greater if the flow from the cylinder chamber CL, CR is greater, or the aperture opening is smaller if the flow is smaller.

In the left and right cylinder passages 3 and 4 of the power steering apparatus 1, the check valves 8 and 9 for checking the flow on the return side leading from the chamber CL or CR of the power cylinder P/C via the flow passage change-over valve CV to the tank T are connected in parallel with the variable throttle valves 6 and 7. Also, the leak passages 11 and 12 are provided for permitting the return flow to the flow passage change-over valve CV even when the flow from the power cylinder P/C is small and the variable throttle valves 6 and 7 are not opened.

Further, in this embodiment, the second check valves 13 and 14 for communicating the cylinder passages 3 and 4 to the tank T are provided, respectively, as a different feature from the steering damper according to the related art. These second check valves 13 and 14 are closed when the cylinder passages 3 and 4 are at high pressure, and opened when a negative pressure is about to arise within the cylinder passages 3 and 4, thereby communicating to the tank T to prevent the negative pressure from occurring.

FIGS. 2 and 3 show one example of the specific structure in which the steering damper 10 is applied to the power steering apparatus 1. The entire construction of the power steering apparatus 1 will be briefly described below.

The power steering apparatus 1 with the steering damper 10 according to this embodiment is a rack-pinion type power steering apparatus having an input shaft (stub axle) 20 linked with the steering wheel for the vehicle, not shown, connected via a torsion bar 24 to an output shaft (pinion axle) 22 disposed on the same axial line, and is rotatably received within a valve housing 26. A pinion 22a formed at the top end of the output shaft 22 is meshed with a rack 28a formed around a rack axle 28. This valve housing 26 is formed integrally with a steering body 30 slidably supporting the rack axle 28.

A valve sleeve 16 is formed in a large diameter barrel-like portion 22b of the output shaft 22 provided on the side of the input shaft 20 (to the right in FIG. 2), while a valve rotor 15 is formed on an outer face of the input shaft 20 fitted into this large diameter barrel-like portion 22b, whereby the flow passage change-over valve CV of rotary type is constituted of the valve sleeve 16 and the valve rotor 15.

A plurality of (e.g., six) axial grooves are arranged at an equal interval circumferentially on the outer surface of the valve rotor 15, and connected alternatively to the pump P and the tank T. Also, the same number of axial grooves are arranged at an equal interval circumferentially on the inner surface of the valve sleeve 16, and connected alternatively to the left and right chambers CL and CR of the power cylinder P/C (see the flow passage change-over valve CV in FIG. 1).

In this power cylinder apparatus 1, if the input shaft 20 is rotated by the operation of the steering wheel, and the input shaft 20 and the output shaft 22, namely, the valve rotor 15 and the valve sleeve 16, are relatively rotated, a pressure oil discharged from the pump P is supplied to one of the chambers CL and CR of the power cylinder P/C, and a working fluid in the other chamber CR or CL is flowed back to the tank T.

Within the valve housing 16, the variable throttle valves 6 and 7, the check valves 8 and 9, and the second check valves 13 and 14 communicating the cylinder passages 3 and 4 to the tank T are provided to constitute the damper portions 10A and 10B, respectively. The damper portions 10A and 10B provided in the cylinder passages 3 and 4 between the flow passage change-over valve CV and the left and right chambers CL and CR of the power cylinder P/C have the same constitution, and one damper portion 10A will be only described below.

The valve housing 26 is provided with a valve bore 34 with a step in a direction orthogonal to the axial line of the input and output shafts 20 and 22. This valve bore 34 has a small diameter portion 34a and a large diameter portion 34b formed internally. A plug 38 having a seal member 36 fitted around the outer periphery thereof is inserted into an opening portion 34c (at the right end in FIG. 3) of the large diameter portion 34b and is engaged with an inner face of the valve bore 34 to be hermetically sealed.

The barrel-like valve plug 40 (hereinafter referred to as a first valve plug) of the variable throttle valve 6 is received within the large diameter portion 34b of the valve bore 34. The first valve plug 40 is formed with a flange 40a at the top end (at the left end in FIG. 3), and when the flange 40a contacts with the valve seat 34d formed in the step portion between the large diameter portion 34b and the small diameter portion 34a of the valve bore 34, the variable throttle valve 6 is closed. A coil spring 42 as a biasing unit is disposed between a rear face of the flange 40a of this first valve plug 40 and a front face of the plug 38 to always bias the first valve plug 40 in a direction toward the valve seat 34d.

Also, a cylindrical valve plug with bottom 44 (hereinafter referred to as a second valve plug) for the check valve 8 is contained in the small diameter portion 34a of the valve bore 34. The second valve plug 44 is biased in a direction toward the first valve plug 40 by a coil spring (biasing means) 46. A top end face 44a of the second valve plug 44 is tapered, and seated in the valve seat 40b formed on an inner circumferential face of the opening portion on the side of the flange 40a of the first valve plug 40, so that the check valve 8 is closed. It is apparent that a biasing force of the spring 46 for biasing the valve plug (second valve plug 44) of this check valve 8 is less than that of the spring 42 for biasing the valve plug (first valve plug 40) of the variable throttle valve 6.

A top end portion 44b of the second valve plug (valve plug of the check valve 8) having a cylindrical shape with bottom is thickened, and is formed with a communication bore 11 for penetrating through an axial center of the thickened portion 44b at this top end. This communication bore 11 constitutes a leak passage to the flow passage change-over valve CV, even when there is a small flow from the power cylinder P/C.

A connecting pipe 50 (constituting a downstream portion of the cylinder passage 3) to the power cylinder P/C is inserted into an opening portion 34e (at the left end in FIG. 3) on the side of the small diameter portion 34a of the valve bore 34, and secured by a flared fitting 52.

A passage bore 54 (constituting an upstream portion of the cylinder passage 3) connected to the flow passage change-over valve CV is opened within the large diameter portion 34b of the valve bore 34. This passage bore 54 is in communication to an axial groove formed on the inner face of the valve sleeve 16 via a radial bore 16a and an annular groove 16b (see FIG. 2) formed in the valve sleeve 16. Also, the first valve plug 40 of the variable throttle valve 6 contained in the large diameter portion 34b of the valve bore 34 is formed with a passage hole 40c passing inside and outside, and the second valve plug 44 of the check valve 8 is formed with a passage hole 44c passing inside and outside.

A second check valve 13 in communication to the tank T is provided between the check valve 8 of the damper portion 10A and the cylinder chamber CL of the power cylinder P/C. This check valve 13 is made up of a ball valve 58 contained in a valve bore 56 orthogonal to the valve bore 34 and a valve seat 56a provided in the step portion between a small diameter portion 60 on the inner side of the valve bore 56 and the valve bore 56. This ball valve 58 is kept secure by a falling prevention ring 62 fitted behind it. The small diameter bore 60 inside the valve bore 56 is in communication to a tank port 66 via an annular groove 22c formed on an outer circumferential face of the valve sleeve 16 (large diameter portion 22b of the output shaft 22) received within the valve housing 26. A blind plug ball is inserted under pressure into the opening portion (upward in FIG. 3) of the valve bore 56 and sealed therein.

Referring to FIGS. 1 to 3, operation of the steering damper 10 having the above constitution will be described below. When a positive input is made by steering operation of the steering wheel (not shown), a pressure oil from the pump P via the supply passage 2 is fed from the flow passage change-over valve CV through one supply passage 3 (passage bore 54 of the valve housing 26) or 4 into the large diameter portion 34b of the valve bore 34, and further through a passage hole 40c of the first valve plug 40 into inside of the first valve plug 40 to act on the valve plug (second valve plug 44) of the check valve 8, 9. When a flow through the flow passage change-over valve CV pushes and opens the check valve 8 or 9, the pressure oil enters through the passage hole 44c of the second valve plug 44 into inside of the second valve plug 44, and is fed through the supply passage 3 (connecting pipe 50) or 4 to one cylinder chamber CL or CR of the power cylinder P/C.

When the positive input is made, a pressure oil from the flow passage change-over valve CV opens the check valve 8, 9 and is supplied to one chamber CL, CR of the power cylinder P/C, and a return oil from the other cylinder chamber CL, CR passes through the opened variable throttle valve 6, 7 and the communication bore 11, 12 formed at the top end portion of the second valve plug 44, and returns from flow passage change-over valve CV to the tank T. In this manner, high pressure oil from the pump P is introduced into one of the left and right chambers CL and CR of the power cylinder P/C, the other chamber being in communication to the tank T, whereby the power cylinder P/C is activated to produce a steering assist force.

When the steering wheel is rapidly operated, a piston within the power cylinder P/C tends to move manually, but a negative pressure is likely to occur within the cylinder passage 3, 4, because a sufficient amount of oil is not supplied. If the negative pressure is about to occur within the cylinder passage 3, 4, the second check valve 13 or 14 is opened so that oil is supplied from the tank T. Accordingly, no negative pressure occurs within the cylinder passage 3, 4, whereby it is possible to prevent such a malfunction that the handle turns heavy suddenly. Similarly, when the handle is returned, no negative pressure occurs within the cylinder passage 3, 4, whereby the handle is prevented from returning unfavorably.

On the other hand, when road load such as kick back is exerted from the front wheels due to irregularities or an obstacle on the road surface while the vehicle is running, a flow of oil from one chamber CL or CR of the power cylinder P/C is passed through one cylinder passage 3 or 4 (the connecting pipe 50 on the side of the power cylinder in FIG. 3) into the second valve plug 44 of the check valve 8, 9 and flows through the communication bore 11 formed in the thickened portion 44b at the top end of the second valve plug 44 into the first valve plug 40. In this manner, since the communication bore 11, 12 is formed in the second valve plug 44, even if there is only a small amount of flow from the power cylinder P/C so that the variable throttle valve 6, 7 is not opened, the oil can be flowed back via the flow passage change-over valve CV to the tank T. Accordingly, the return of the steering wheel, particularly the return of the steering wheel in the vicinity of neutral position is improved. In this embodiment, the leak passage is made up of the communication bore 11 of small diameter passing through the bottom portion 44b of the second valve plug 44, whereby the passage area can be easily controlled to attain desired steering characteristics. The manufacturing costs can be reduced because only one through hole 11 is only produced.

In the case where the road load such as kick back is great, and there is a large amount of flow from the power cylinder P/C, the upstream pressure rises due to a flow passing through the communication bore 11, 12. If there is a great pressure difference in the vicinity of the communication bore 11, 12, the first valve plug 40 of the variable throttle valve 6, 7 is moved to the right in FIG. 3, to open the variable throttle valve 6, 7. A return flow from the power cylinder P/C opens the variable throttle valve 6, 7 at a certain angle corresponding to the pressure difference in the vicinity of the communication bore 11, 12 to flow back via the flow passage change-over valve CV to the tank T. With a damper effect for damping or relieving the impact owing to flow resistance at this time, the transmission of the road load to the steering wheel can be blocked.

In the first embodiment, the steering damper 10 according to this invention is applied to the rack-pinion type power steering apparatus 1. However, this invention is not only limited to the rack-pinion type, but also may be applied to other type power steering apparatuses.

[Second Embodiment]

Figure 4:
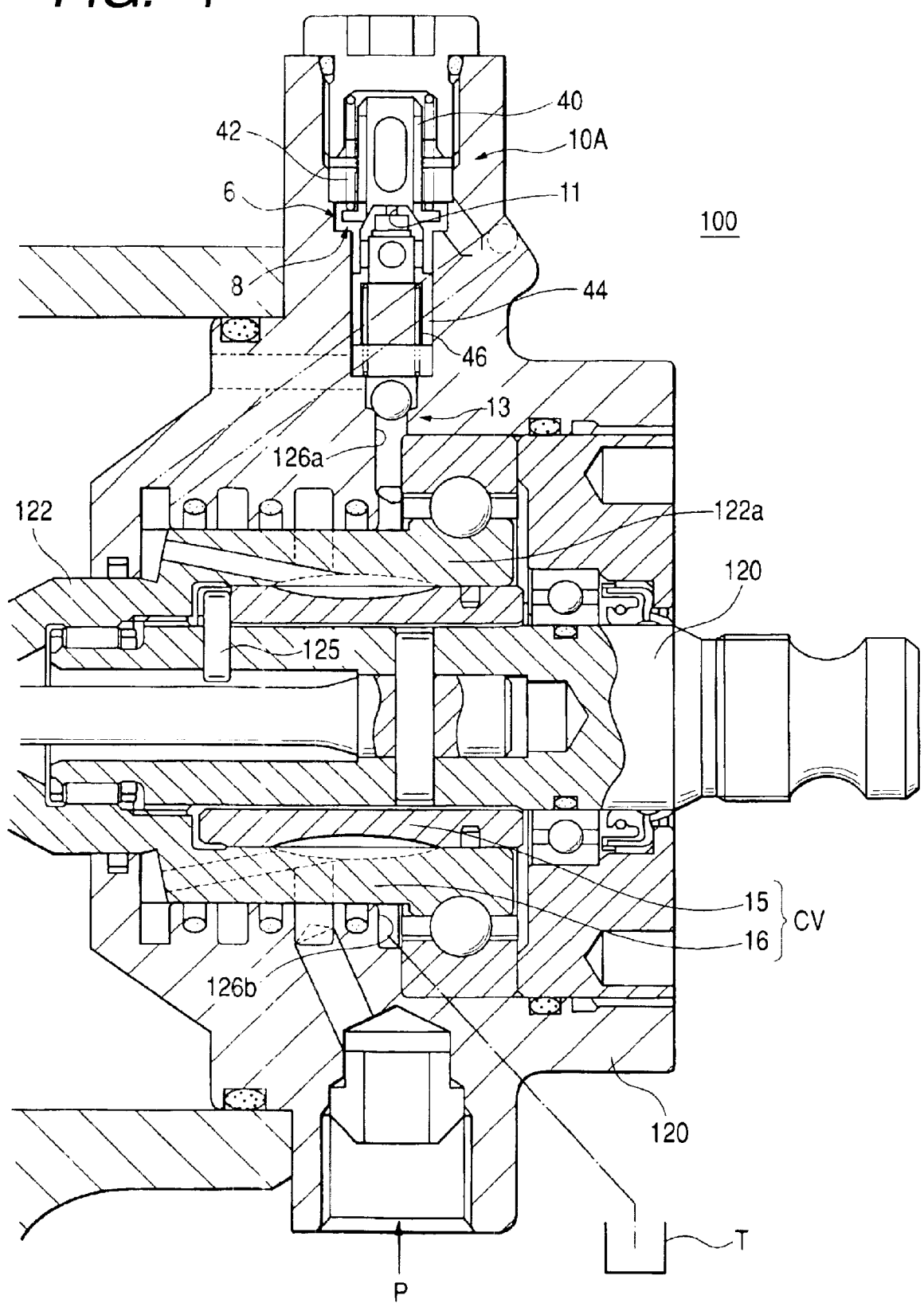
FIG. 4 is a longitudinal cross-sectional view of the essence of an integral type power steering apparatus to which the steering damper is applied.

FIG. 4 shows a second embodiment in which the steering damper 10 of the invention is applied to an integral type power steering apparatus 100. The constitution of the damper portions 10A and 10B is the same as in the first embodiment, like reference numerals represent like parts and the description of those parts is omitted.

This integral type power steering apparatus 100 has an input shaft (stub axle) 120 and an output shaft (worm shaft) 122 arranged on the same straight line, and connected via a torsion bar 124 to be relatively rotatable within a predetermined angle. The valve sleeve 16 is formed in a large diameter barrel-like portion 122a of the output shaft 122, while the valve rotor 15 is fitted around the outer periphery of the input shaft 120, and connected by a pin 125, whereby a flow passage change-over valve CV of rotary type is constituted of the valve sleeve 16 and the valve rotor 15.

A plurality of (e.g., six) axial grooves are arranged at an equal interval circumferentially on the outer surface of the valve rotor 15, and communicated alternatively to the pump P and the tank T. Also, the same number of axial grooves are arranged at an equal interval circumferentially on the inner surface of the valve sleeve 16, and communicated alternatively to the left and right chambers CL and CR of the power cylinder P/C. At a neutral position of the flow passage change-over valve CV, the axial grooves of the valve rotor 15 and the axial grooves of the valve sleeve 16 are positioned one after another. If the input shaft 120 is rotated by the operation of steering wheel, and the valve rotor 15 and the valve sleeve 16 are relatively rotated, one of the left and right chambers CL and CR of the power cylinder P/C is connected to the pump P, and the other chamber is communicated to the tank T, thereby activating the power cylinder P/C.

In each cylinder passage 3, 4 leading from the flow passage change-over valve CV to the left and right chambers CL and CR of the power cylinder P/C, the damper portion 10A, 10B is provided in the same manner as in the first embodiment. These damper portions 10A, 10B have the variable throttle valves 6 and 7, the check valves 8 and 9, the communication bores 11 and 12 as the lead passages, respectively. In this embodiment, the damper portions 10A and 10B have the same constitution, and only one damper portion 10A is illustrated in the figure.

The second check valve 13, 14 for communicating the passage 3, 4 to the tank T when the cylinder passage 3, 4 is about to be a negative pressure is provided between the check valve 8, 9 of the damper portion 10A, 10B and the left and right chamber CL, CR of the power cylinder P/C. These check valves 13 and 14 are closed when the cylinder passages 3 and 4 are at high pressure, and opened, when a negative pressure is about to occur, to communicate through a passageway 126a within a valve housing 126 and via an annular groove 126b to the tank T, thereby preventing the negative pressure from arising. In this embodiment, like the previous embodiment, the negative pressure within the cylinder passage 3, 4 is avoided, when the steering is rapidly conducted or the handle is returned, thereby preventing the handle from turning heavy suddenly, or returned unfavorably. At the top end of the second valve plug 44 of the check valve 8, the communication bore (leak passage) 11 is formed. This communication bore 11, like that of the first embodiment, is a single hole passing through an axial center of the second valve plug 44, thereby exhibiting the same effect as in the previous embodiment.

[Third Embodiment]

Figure 5:
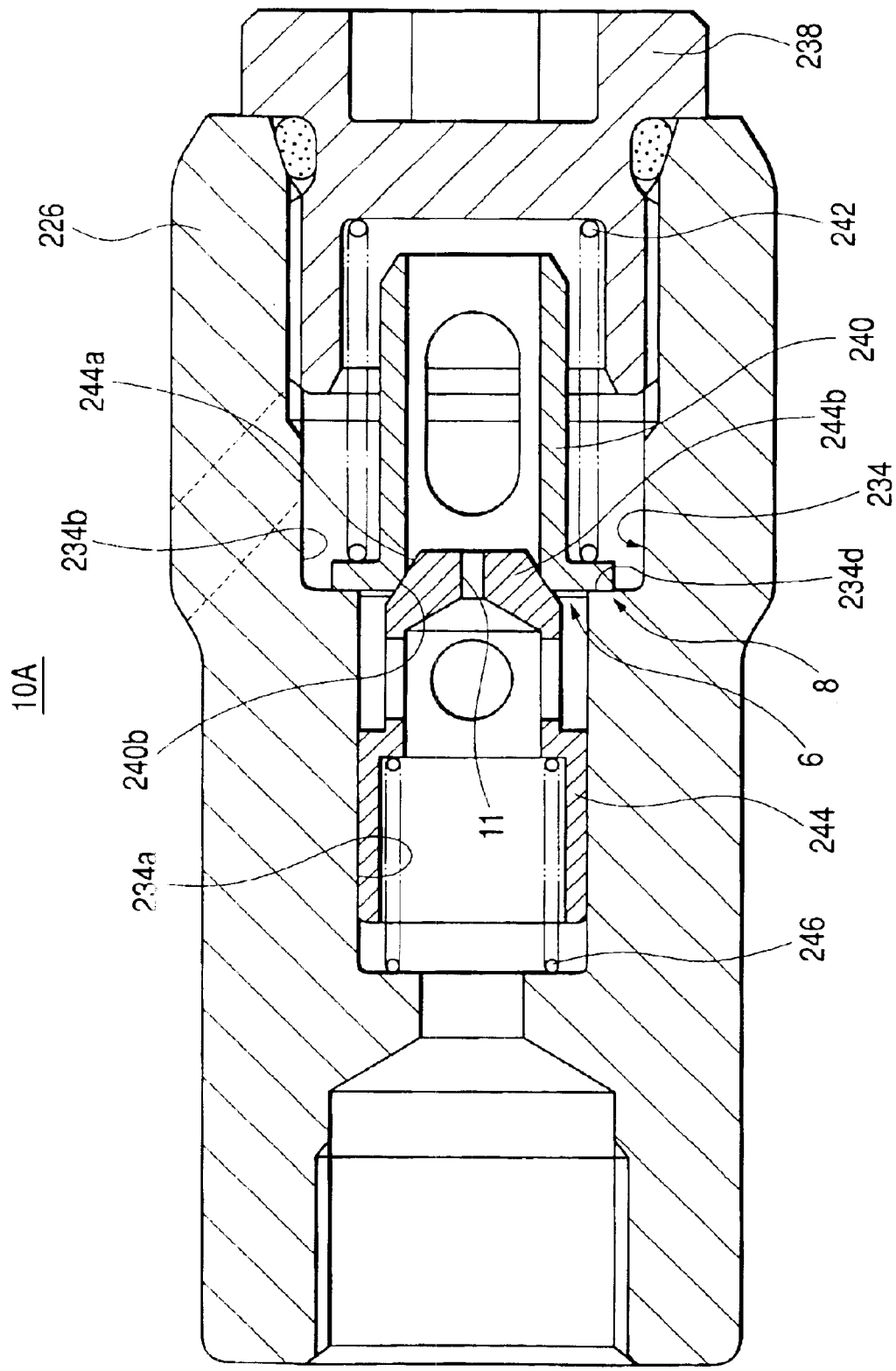
FIG. 5 is a longitudinal cross-sectional view showing one damper portion of the steering damper according to a third embodiment of the invention.

FIG. 5 is a view showing one damper portion 10A of the steering damper 10 according to the third embodiment of the invention. In this embodiment, a barrel-like valve plug (first valve plug) 240 is contained within a large diameter portion 234b of a valve bore 234 formed in a valve housing 226. The first valve plug 240 is biased toward a valve seat 234d provided in a step portion between the large diameter portion 234b and a small diameter portion 234a of the valve bore 234 by a spring 242 disposed between a plug 238 engaged around an opening portion and the first valve plug 240. The variable throttle valve 6 is made up of the first valve plug 240 and the valve seat 234d on the inner face of the valve housing 226.

Also, a cylindrical valve plug with bottom (second valve plug) 244 of the check valve 8 is contained within the small diameter portion 234a of the valve bore 234, and biased in a direction toward the first valve plug 240 by a spring 246 disposed behind, so that a taper face 244a at the top end is seated in a valve seat 240b formed in the first valve plug 240. The check valve 8 is made up of the second valve plug 244 and the valve seat 240b provided in the first valve plug 240. Furthermore, a top end portion 244b of the second valve plug 244 is thickened, and the communication bore (leak passage) 11 of smaller diameter passing through the axial center thereof is formed in this thickened portion 244b.

In this embodiment, the communication bore as the leak passage is a single through hole, and has a larger passage area as compared with the leak passage according to the related art having a plurality of narrow grooves arranged at an equal interval on the circumference thereof. Therefore, the precision of the communication bore can be easily controlled to obtain the desired steering characteristics. The communication bore can be simply worked with lower costs.

[Fourth Embodiment]

Figure 6:
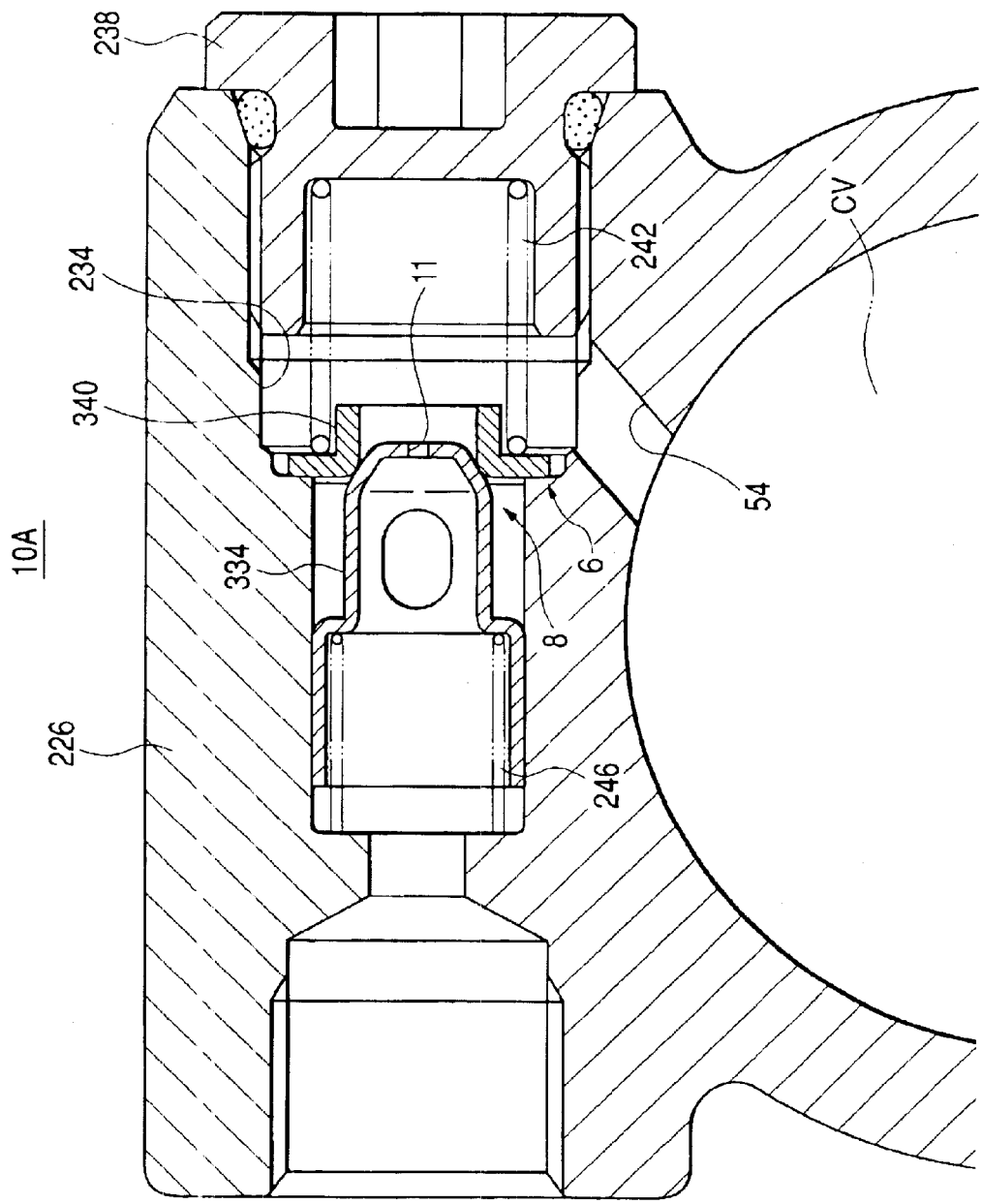
FIG. 6 is a longitudinal cross-sectional view showing one damper portion of the steering damper according to a fourth embodiment of the invention.

FIG. 6 is a view showing one damper portion of the steering damper 10 according to the fourth embodiment of the invention, which is the same as the previous embodiment of FIG. 5 except for the construction of a barrel-like valve plug (first valve plug) 340 of the variable throttle valve 6 and a cylindrical valve plug with bottom (second valve plug) 344 of the check valve 8. Like reference numerals represent like parts and the description of those parts is omitted.

In this embodiment, the second valve plug 344 is formed by press working. The communication bore (leak passage) 11 of small diameter is provided at a top end portion of the second valve plug 344. Also, the first valve plug 340 is significantly shortened in length. In this embodiment, there is no need for providing a passageway through the barrel-like wall face of the first valve plug 234 and a stopper function, because the passage bore 54 connected to the flow passage change-over valve CV is formed through a side wall of the valve bore 234, whereby the first valve plug 340 can be shortened. In this embodiment, there are obtained the same operation and effect as in the previous embodiment of FIG. 5. Furthermore, in this embodiment, the second valve plug 344 is molded by press, and the first valve plug 340 is shortened, whereby the costs can be reduced, and the working process can be simplified.

[Fifth Embodiment]

Figure 7:
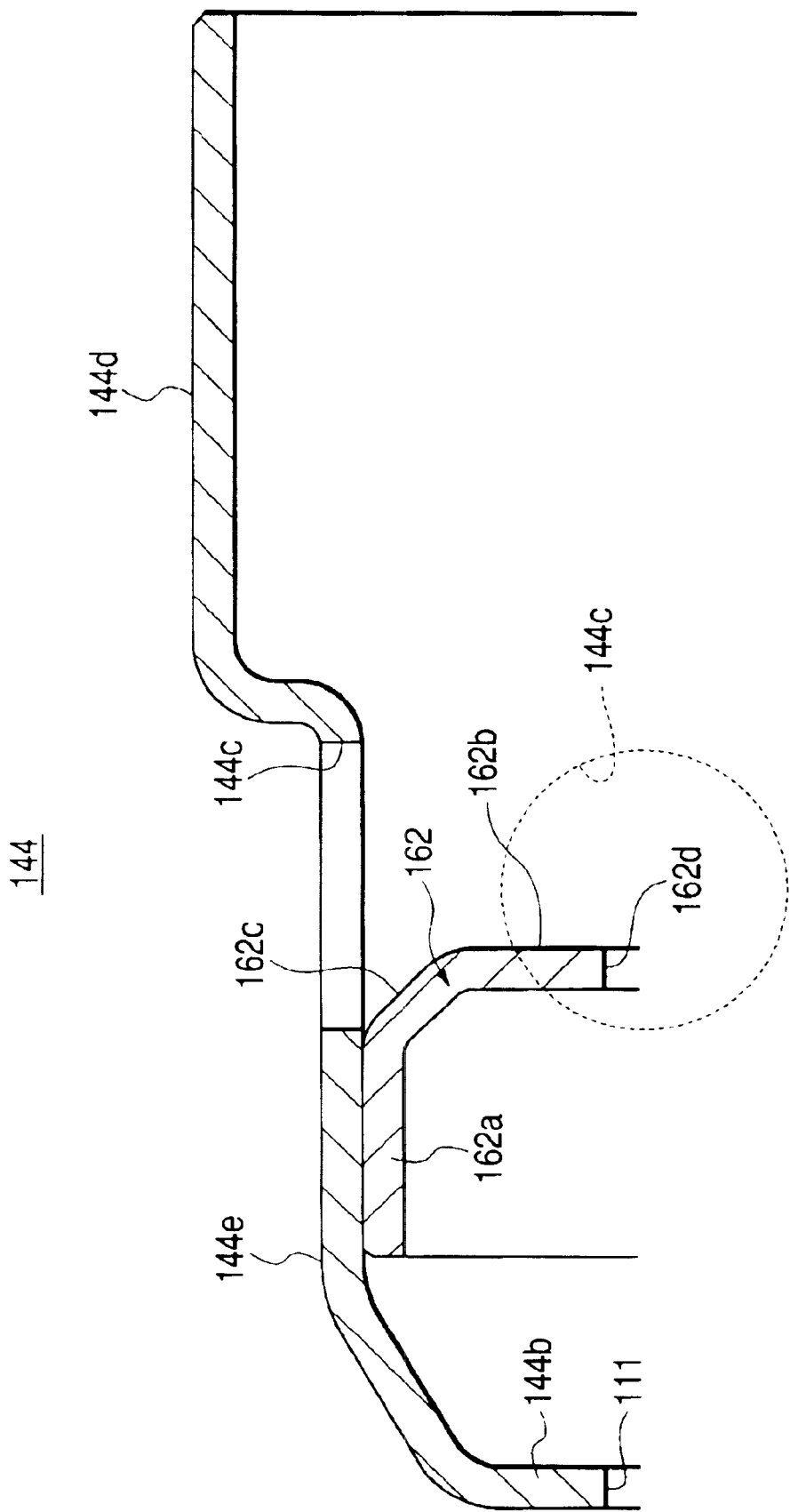
FIG. 7 is a longitudinal cross-sectional view showing a valve plug of the check valve for the steering damper according to a fifth embodiment of the invention.

FIG. 7 is a longitudinal cross-sectional view showing in enlargement only a valve plug 144 of the check valve for use with the steering damper according to the fifth embodiment of the invention. Other parts of this embodiment are the same as those of FIGS. 1 to 3, except for the valve plug 144 of the check valve, and the other parts are not illustrated. The necessary parts are only designated by the same numerals as used in FIGS. 1 to 3.

The valve plug (second valve plug) 144 of this check valve is molded by press working a member like a plate as a whole. This second valve plug 144 is of cylindrical shape with bottom, in which a communication bore (restriction) 111 is formed in a central section of the bottom portion 144b at the top end thereof (to the left in FIG. 7). This second valve plug 144 has a large diameter portion 144d sliding within the valve bore 34 formed in the housing 26 and a small diameter portion 144e located closer to the bottom portion 144b. Also, the small diameter portion 144e is formed with a passage hole 144c for communication between inside and outside of the second valve plug 144.

Further, a cap 162 substantially like a cup is fitted within the small diameter portion 144e of the second valve plug 144 on the side closer to the bottom portion 144b than the passage hole 144c. This cap 162 is secured onto an inner face of the small diameter portion 144e of the second valve plug 144 by press fitting or caulking. The cap 162 has a cylindrical portion 162a secured onto the inner face of the second valve plug 144, a bottom face 162b directed toward the large diameter portion 144d of the second valve plug 144, and an inclined face 162c connecting the cylindrical portion 162a with the bottom face 162b. The inclined face 162c on the side of cylindrical portion 162a (outer circumferential portion) is almost coincident with an end portion of the passage hole 144c for the second valve plug 144 on the side of the bottom portion 144b.

Accordingly, a working oil flowing from the power cylinder P/C can flow out smoothly along the inclined face 162c from the inside to the outside of the second valve plug 144, in the case of opening the variable throttle valve 6 to flow back to the flow passage change-over valve CV. In the first embodiment, a pressure oil that opens the check valve 6 and flows from the outside to the inside of the second valve plug 44 (see the arrow I of the broken line in FIG. 3) has less pressure loss, but a pressure oil that opens the variable throttle valve 6 and flows out from the inside to the outside of the second valve plug 44 (see the arrow O of the solid line in FIG. 3) has a more pressure loss than when it flows in, because a space 160 located on the side of bottom face of the second valve plug 44 produces sump and disturbs the flow of the pressure oil. However, in this embodiment, when the pressure oil flows out, the pressure loss can be suppressed to the almost equivalent amount to that when it flows in.

Further, on the bottom face 162b of this cap 162, a communication bore (restriction) 162d of the same diameter as that of the communication bore (restriction) 111 formed in the bottom portion 144b of the second valve plug 144 is formed on the same axial line. The communication bore 111 (11) formed in the second valve plug 144 (44) needs to have a constant length (see A in FIG. 3). In this embodiment, since the second valve plug 144 is molded by press working the plate, the length of the communication bore 111 on the bottom portion 144b of the second valve plug 144 can not be secured to be as long as the first embodiment taken. However, the needed length of the restriction can be secured by forming the communication bore 162d on the cap 162.

[Sixth Embodiment]

Figure 8:
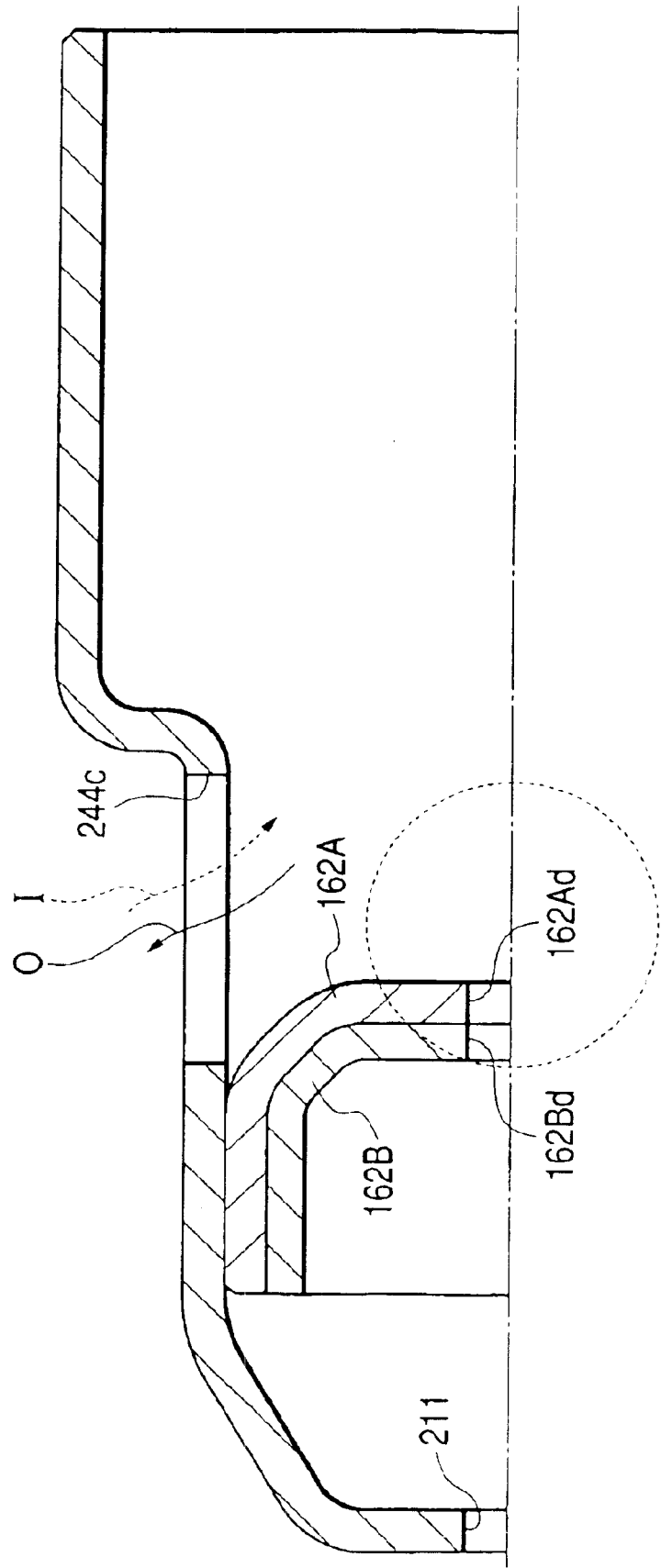
FIG. 8 is a longitudinal cross-sectional view showing a valve plug of the check valve for the steering damper according to a sixth embodiment of the invention.

FIG. 8 is a longitudinal cross-sectional view of the valve plug 244 constituting the check valve 8 for the steering damper according to the sixth embodiment of the invention. In this embodiment, the cap 162 is constructed in two layers (162A, 162B). The communication bores (restrictions) 162Ad and 162Bd are formed in the same positions as the two-layer caps 162A and 162B. Since these caps 162A and 162B are molded by press working in the same manner as the second valve plug 144, with a smaller plate thickness, the length of the communication bores (restrictions) 162Ad and 162Bd can not be taken sufficiently by a single layer. However, the needed length of the restriction can be secured by making the caps 162A and 162B of two-layer structure. The caps 162A and 162B are not only limited to two layers, but also may be constructed in three or more layers. If the cap 162 is overlapped in layers as required, the needed length of the restriction can be easily obtained.

The above-described embodiments are not limited to the steering damper provided within the valve housing for the integral type power steering apparatus as shown in FIG. 3. The above described embodiments may be applied to the steering damper within the valve member.

As described above, a steering damper attached to a power steering apparatus having a flow passage change-over valve for selectively changing a flow passage among a pump and a tank and left and right chambers of the power cylinder in accordance with steering operation of a steering wheel, and a pair of left and right cylinder passages for connecting the flow passage change-over valve to the left and right chambers, the steering damper includes:

a pair of damper portions each having:
a variable throttle valve for restricting inflow from the power cylinder into the flow passage change-over valve, the variable throttle valve provided between the flow passage change-over valve and each of the left and right chambers of the power cylinder; and
a first check valve for permitting inflow from the flow passage change-over valve into the power cylinder, the check valve connected in parallel with the variable throttle valve; and second check valves in communication to the tank, provided between the first check valves and the left and right chambers. Therefore, at the time of rapid steering or when the handle is returned, the steering damper prevents a negative pressure from occurring within the cylinder passage, and prevents the handle from turning heavy suddenly or being returned unfavorably.

In the third aspect of the invention, the variable throttle valve has a step portion, which is a valve seat of the variable throttle valve formed on an inner surface of a housing and a barrel-like valve plug for abutting with the step portion to close the variable throttle valve. A first biasing member biases the barrel-like valve plug in a valve seat direction. The first check valve has a cylindrical valve plug with bottom for abutting an opening portion of the barrel-like portion to close the first check valve and a second biasing member for biasing the cylindrical valve plug with bottom from a direction opposite to the first biasing member. A communication bore is formed through a bottom face of the cylindrical valve plug with bottom. Therefore, the steering damper has a greater passage area than that of the conventional leak passage in which a plurality of narrow grooves are arranged at an equal interval on the circumference, and can be controlled at high precision to easily acquire the desired steering characteristics, with simple working and lower manufacturing costs.

According to the fifth and sixth aspect of the invention, the material costs and the manufacturing costs are reduced to produce the steering damper inexpensively.

Further, in the seventh aspect of the invention, the cylindrical valve plug with bottom has a passage hole to penetrate inside and outside in a cylindrical portion thereof and a cap is attached within the cylindrical valve plug on a side closer to the bottom thereof than the passage hole. In the eighth aspect of the invention, fluid from the flow passage change-over valve is flown from an outer face of the cylindrical valve plug through the passage hole thereinto and fluid from the side of the power cylinder is flown from the inside of the cylindrical valve plug through the passage hole to the outer face thereof. Therefore, the fluid flowing from the inside of the valve plug for the check valve to the outside has a lower pressure loss that is almost equivalent to that of the fluid flowing from the outside of the valve plug to the inside.

In the ninth aspect of the invention, the cap has an inclined face for smoothly flowing a fluid that flows from the inside of the passage hole to the outside thereof. Thereby, the pressure loss can be further reduced.

In the tenth aspect of the invention, a communication bore that penetrates through a bottom face of said valve plug for said check valve is formed and a communication bore is formed on a bottom face of the cap. Therefore, the valve plug of small thickness molded by press working can also keep a required length of aperture.

In the eleventh aspect of the invention, the steering damper has the cap molded by press working. Therefore, the steering damper can be produced cheaply.

In the twelfth aspect of the invention, the communication bore is defined by a plurality of the caps, which overlap each other. In the thirteenth aspect of the invention, the length of the communication bore is variable. Therefore, a required length of aperture can be secured and arbitrarily set.

What is claimed is:

1. A steering damper attached to a power steering apparatus having a flow passage change-over valve for selectively changing a flow passage among a pump and a tank and left and right chambers of the power cylinder in accordance with steering operation of a steering wheel, and a pair of left and right cylinder passages for connecting the flow passage change-over valve to the left and right chambers, the steering damper comprising:
   a pair of damper portions each having:
      a variable throttle valve for restricting inflow from the power cylinder into the flow passage change-over valve, the variable throttle valve provided between the flow passage change-over valve and each of the left and right chambers of the power cylinder; and
      a first check valve for permitting inflow from the flow passage change-over valve into the power cylinder, the check valve connected in parallel with the variable throttle valve; and
   second check valves in communication to the tank, provided between the first check valves and the left and right chambers.

2. The steering damper according to claim 1, further comprising communication bores provided between the flow passage change-over valve and the left and right cylinder chambers,
   wherein the communication bores are connected in parallel with the variable throttles, respectively.

3. A steering damper attached to a power steering apparatus having a flow passage change-over valve for selectively changing a flow passage among a pump and a tank and left and right chambers of the power cylinder in accordance with steering operation of a steering wheel, and a pair of left and right cylinder passages for connecting the flow passage change-over valve to the left and right chambers, the steering damper comprising:
   a pair of damper portions each having:
      a variable throttle valve for restricting inflow from the power cylinder into the flow passage change-over valve in accordance with steering operation of a steering wheel, the variable throttle valve provided between the flow passage change-over valve and the left and right chambers of the power cylinder; and
      a first check valve for permitting inflow from the flow passage change-over valve into the power cylinder, the check valve connected in parallel with the variable throttle valve;
   wherein the variable throttle valve has:
      a step portion, which is a valve seat of the variable throttle valve formed on an inner surface of a housing; and
      a barrel-like valve plug for abutting with the step portion to close the variable throttle valve;
   wherein a first biasing member biases the barrel-like valve plug in a valve seat direction;
   wherein the first check valve has:
      a cylindrical valve plug with bottom for abutting an opening portion of the barrel-like portion to close the first check valve; and
      a second biasing member for biasing the cylindrical valve plug with bottom from a direction opposite to the first biasing member; and
   wherein a communication bore is formed through a bottom face of the cylindrical valve plug with bottom.

4. The steering damper according to claim 3, further comprising second check valves in communication to the tank, the second check valves provided between the first check valves and the left and right chambers of the power cylinder.

5. The steering damper according to claim 4, wherein the cylindrical valve plug is molded by press working.

6. The steering damper according to claim 3, wherein the cylindrical valve plug is molded by press working.

7. The steering damper according to claim 3,
   wherein the cylindrical valve plug with bottom has a passage hole to extending between inside and outside in a cylindrical portion thereof; and
   wherein a cap is attached within the cylindrical valve plug on a side closer to the bottom thereof than the passage hole.

8. The steering damper according to claim 7, wherein fluid from the flow passage change-over valve flows from an outer face of the cylindrical valve plug through the passage hole thereinto; and
   wherein fluid from the side of the power cylinder is flown from the inside of the cylindrical valve plug through the passage hole to the outer face thereof.

9. The steering damper according to claim 7, wherein the cap has an inclined face for smoothly flowing a fluid that flows from the inside of the passage hole to the outside thereof.

10. The steering damper according to claim 7, wherein a communication bore that penetrates through a bottom face of said valve plug for said check valve is formed and a communication bore is formed on a bottom face of the cap.

11. The steering damper according to claim 10, wherein the cap is molded by press working.

12. The steering damper according to claim 11, wherein the communication bore is disposed through a plurality of the caps, which overlap each other.

13. The steering damper according to claim 12, wherein the length of the communication bore is variable.

14. A power steering apparatus comprising:

a pump for supplying oil;

a tank for receiving returned oil;

a power cylinder having left and right chambers;

a flow passage change-over valve for selectively changing a flow passage among the pump and the tank and the left and right chambers in accordance with steering operation of a steering wheel;

a steering damper having:
 a pair of damper portions each including:
  a variable throttle valve for restricting inflow from the power cylinder into the flow passage change-over valve, the variable throttle valve provided between the flow passage change-over valve and each of the left and right chambers of the power cylinder; and
  a first check valve for permitting inflow from the flow passage change-over valve into the power cylinder, the check valve connected in parallel with the variable throttle valve; and second check valves in communication to the tank, provided between the first check valves and the left and right chambers.

15. The power steering apparatus according to claim 14, wherein the steering damper further has communication bores provided between the flow passage change-over valve and the left and right cylinder chambers; and wherein the communication bores are connected in parallel with the variable throttles, respectively.

16. A power steering apparatus comprising:

a pump for supplying oil;

a tank for receiving returned oil;

a power cylinder having left and right chambers;

a flow passage change-over valve for selectively changing a flow passage among the pump and the tank and the left and right chambers in accordance with steering operation of a steering wheel;

a steering damper having:
 a pair of damper portions each including:
  a variable throttle valve for restricting inflow from the power cylinder into the flow passage change-over valve, the variable throttle valve provided between the flow passage change-over valve and each of the left and right chambers of the power cylinder; and
  a first check valve for permitting inflow from the flow passage change-over valve into the power cylinder, the check valve connected in parallel with the variable throttle valve; and wherein the variable throttle valve has:
 a step portion, which is a valve seat of the variable throttle valve formed on an inner surface of a housing; and
 a barrel-like valve plug for abutting with the step portion to close the variable throttle valve;

wherein a first biasing member biases the barrel-like valve plug in a valve seat direction;

wherein the first check valve has:
 a cylindrical valve plug with bottom for abutting an opening portion of the barrel-like portion to close the first check valve; and
 a second biasing member for biasing the cylindrical valve plug with bottom from a direction opposite to the first biasing member; and wherein a communication bore is formed through a bottom face of the cylindrical valve plug with bottom.

17. The power steering apparatus according to claim 16, wherein the steering damper further has second check valves in communication to the tank; and wherein the second check valves are provided between the first check valves and the left and right chambers of the power cylinder.

18. The steering damper according to claim 16, wherein the cylindrical valve plug with bottom has a passage hole to extending between inside and outside in a cylindrical portion thereof; and wherein a cap is attached within the cylindrical valve plug on a side closer to the bottom thereof than the passage hole.

19. The steering damper according to claim 18, wherein the cap has an inclined face for smoothly flowing a fluid that flows from the inside of the passage hole to the outside thereof.

20. The steering damper according to claim 18, wherein a communication bore that penetrates through a bottom face of said valve plug for said check valve is formed and a communication bore is formed on a bottom face of said cap.

21. The steering damper according to claim 20, wherein the communication bore is disposed through a plurality of the caps, which overlap each other.

* * * * *